(12) United States Patent
Hashimoto et al.

(10) Patent No.: US 8,482,541 B2
(45) Date of Patent: *Jul. 9, 2013

(54) TOUCH PANEL AND PORTABLE DEVICE USING THE SAME

(75) Inventors: Takao Hashimoto, Kyoto (JP); Kazuhiro Nishikawa, Kyoto (JP); Yoshihiro Kai, Kyoto (JP); Yuichiro Takai, Kyoto (JP); Yuko Endo, Kyoto (JP); Ryomei Omote, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/518,159

(22) PCT Filed: Dec. 13, 2010

(86) PCT No.: PCT/JP2010/072335
§ 371 (c)(1),
(2), (4) Date: Jun. 21, 2012

(87) PCT Pub. No.: WO2011/077981
PCT Pub. Date: Jun. 30, 2011

(65) Prior Publication Data
US 2012/0256865 A1 Oct. 11, 2012

(30) Foreign Application Priority Data

Dec. 22, 2009 (JP) ................................ 2009-291077
Oct. 5, 2010 (JP) ................................ 2010-225900

(51) Int. Cl.
*G06F 3/041* (2006.01)

(52) U.S. Cl.
USPC ........................ 345/173; 178/18.01

(58) Field of Classification Search
USPC ................................. 345/173–181
See application file for complete search history.

(56) References Cited

U.S. PATENT DOCUMENTS

| 7,554,624 | B2 | 6/2009 | Kusuda et al. |
| 7,595,790 | B2 * | 9/2009 | Yamamoto et al. ........... 345/173 |
| 7,813,030 | B2 | 10/2010 | Lo et al. |
| 2006/0170659 | A1 | 8/2006 | Yamamoto et al. |
| 2008/0271933 | A1 * | 11/2008 | Morimoto ................. 178/18.05 |
| 2009/0278815 | A1 | 11/2009 | Li et al. |

FOREIGN PATENT DOCUMENTS

| EP | 1 901 530 | 3/2008 |
| EP | 2 124 137 | 11/2009 |
| JP | 64-14630 | 1/1989 |
| JP | 1-132017 | 5/1989 |
| JP | 5-143219 | 6/1993 |

(Continued)

OTHER PUBLICATIONS

International Preliminary Report on Patentability and Written Opinion of the International Searching Authority issued Jul. 12, 2012 in corresponding International Application No. PCT/JP2010/072335.

(Continued)

*Primary Examiner* — Duc Dinh
(74) *Attorney, Agent, or Firm* — Wenderoth, Lind & Ponack, L.L.P.

(57) ABSTRACT

A gap between an upper transparent electrode base member and a lower transparent electrode base member is filled with a transparent adhesive layer as a pressure-sensitive adhesive layer, to eliminate an air layer.

4 Claims, 11 Drawing Sheets

FOREIGN PATENT DOCUMENTS

| | | |
|---|---|---|
| JP | 6-59796 | 3/1994 |
| JP | 6-342332 | 12/1994 |
| JP | 2002-231098 | 8/2002 |
| JP | 2006-066250 | 3/2006 |
| WO | 2005/064451 | 7/2005 |

OTHER PUBLICATIONS

International Search Report issued Feb. 8, 2011 in International (PCT) Application No. PCT/JP2010/072335.

"Reducing Analog Input Noise in Touch Screen Systems", Texas Instruments, Wendy Fang, Application Report, SBAA155A—Jul. 2007—Revised Sep. 2007.

Office Action issued Dec. 6, 2012 in related U.S. Appl. No. 13/604,714.

Extended European Search Report issued Apr. 3, 2013 in European Application No. 12198054.4.

Extended European Search Report issued Apr. 17, 2013 in European Application No. 10839215.0.

\* cited by examiner

TOUCH PANEL AND PORTABLE DEVICE USING THE SAME

TECHNICAL FIELD

The present invention relates to a touch panel that is applicable to a mobile phone, a portable game device, an electronic dictionary, a car navigation system, a personal computer, a digital camera, a video camera, a portable MD (PMD), and other portable devices, and a portable device using the touch panel.

BACKGROUND ART

Between an upper transparent electrode base member and a lower transparent electrode base member of a touch panel, a space maintained by spacers is secured such that transparent electrodes disposed on respective inner surfaces of the upper transparent electrode base member and the lower transparent electrode base member are not normally brought into contact with each other to establish electrical conduction. By the upper transparent electrode base member being bent only when a pressing force acts thereon, the transparent electrodes are brought into contact with each other to establish electrical conduction, the positional coordinates where the pressing force acted are detected (see Patent Document 1).

CITATION LIST

Patent Literature

Patent Literature 1: International Publication WO2005/064451

SUMMARY OF INVENTION

Technical Problem

However, external light reflects off the interface between the transparent electrode of the upper transparent electrode base member and the space, and off the interface between the space and the transparent electrode of the lower transparent electrode base member. Depending on the gap amount of the space between the upper and lower transparent electrode base members, Newton's rings prone to occur. This poses an issue as to visibility.

Accordingly, an object of the present invention is to solve the issue stated above, and to provide a touch panel with which reflection at the interface is suppressed, the occurrence of Newton's rings is prevented, and visibility is improved, and a portable device that uses the touch panel.

Solution to Problem

In order to achieve the object, the present invention is structured as follows.

In accomplishing these and other aspects, according to a first aspect of the present invention, there is provided a touch panel, comprising:

an upper transparent electrode base member that has an upper transparent electrode on its one surface;

a lower transparent electrode base member that has a lower transparent electrode on its surface facing the surface where the upper transparent electrode is disposed; and an insulating transparent adhesive layer that is disposed between the upper transparent electrode and the lower transparent electrode, and that includes a plurality of pressure-sensitive particles dispersed therein, wherein when a force acts upon other surface of the upper transparent electrode base member, the acting force causes a current to flow among the pressure-sensitive particles in the transparent adhesive layer, whereby an electrical conduction is established between the upper transparent electrode and the lower transparent electrode, and positional coordinates where the force acted upon along the other surface of the upper transparent electrode base member are detected.

According to a sixth aspect of the present invention, there is provided a portable device, comprising:

the touch panel according to the above aspects;

a casing that supports the touch panel; and a display device that is disposed on an inner side of the touch panel inside the casing.

Advantageous Effects of Invention

According to the present invention, the gap between the upper transparent electrode base member and the lower transparent electrode base member is filled with the transparent adhesive layer as a pressure-sensitive adhesive layer without any air layer. Therefore, the light reflection occurring at two interfaces, namely the interface between the upper transparent electrode base member and the air layer, and the interface between the air layer and the lower transparent electrode base member, can be suppressed, and occurrence of Newton's rings can be prevented, whereby visibility can be improved.

Further, in the structure filled with the transparent adhesive layer, by forming the transparent liquid-state intermediate layer between the upper transparent electrode and the transparent adhesive layer, few bubbles (bubble inclusion) that are produced when the upper transparent electrode base member is stacked on the transparent adhesive layer can be expelled substantially completely.

BRIEF DESCRIPTION OF DRAWINGS

These and other aspects and features of the present invention will become clear from the following description taken in conjunction with the preferred embodiments thereof with reference to the accompanying drawings, in which.

DESCRIPTION OF EMBODIMENTS

Figure 1:
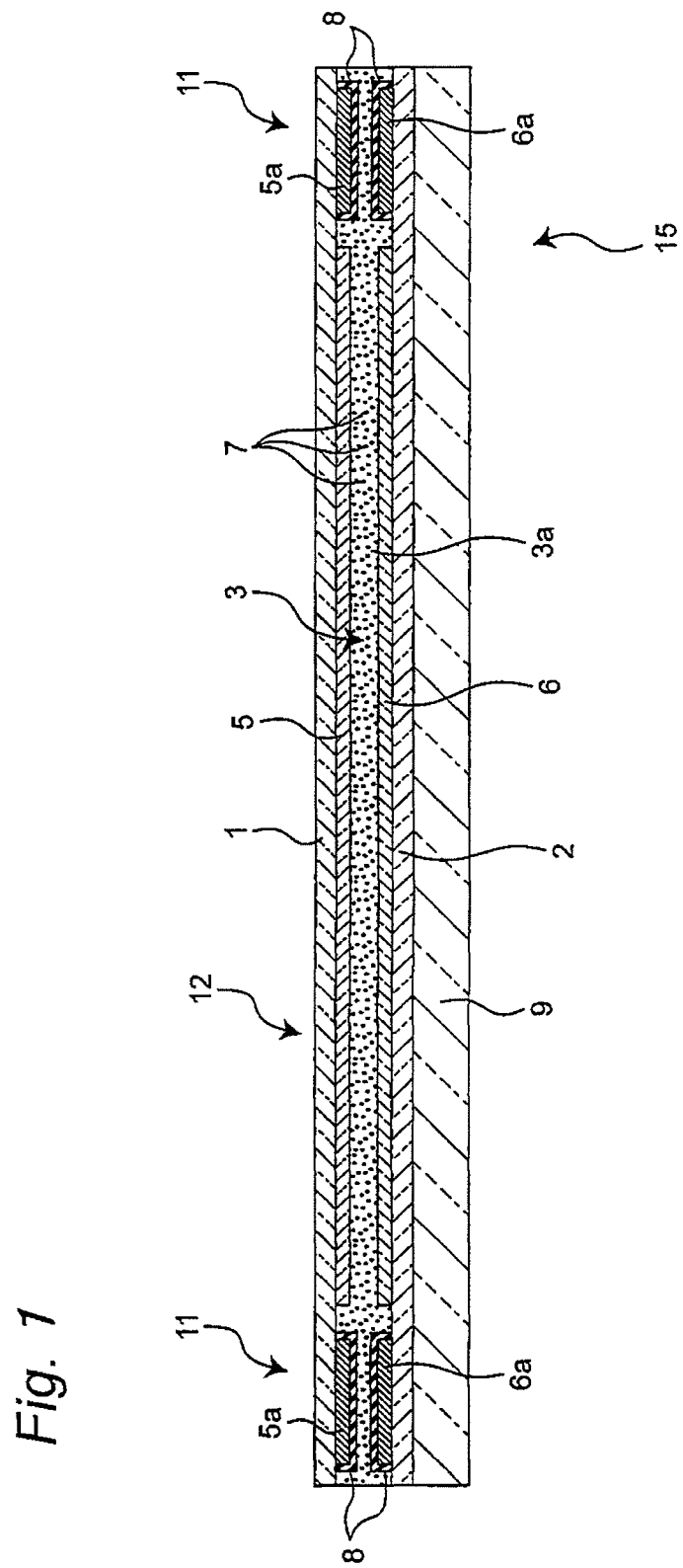
FIG. 1 is a cross-sectional view of a touch panel according to a first embodiment of the present invention.

Before proceeding with the description of the present invention, it is to be noted that identical components are denoted by the same reference characters in the accompanying drawings.

In the following, with reference to the drawings, before proceeding with the detailed description of embodiments of the present invention, a description will be given of various modes of the present invention.

According to a first aspect of the present invention, there is provided a touch panel, comprising:

an upper transparent electrode base member that has an upper transparent electrode on its one surface;

a lower transparent electrode base member that has a lower transparent electrode on its surface facing the surface where the upper transparent electrode is disposed; and an insulating transparent adhesive layer that is disposed between the upper transparent electrode and the lower transparent electrode, and that includes a plurality of pressure-sensitive particles dispersed therein, wherein when a force acts upon other surface of the upper transparent electrode base member, the acting force causes a current to flow among the pressure-sensitive particles in the transparent adhesive layer, whereby an electrical conduction is established between the upper transparent electrode and the lower transparent electrode, and positional coordinates where the force acted upon along the other surface of the upper transparent electrode base member are detected.

According to a second aspect of the present invention, there is provided the touch panel according to the first aspect, further comprises:

a Z-direction detecting unit, wherein when the force acts upon the other surface of the upper transparent electrode base member, the acting force causes the current to flow among the pressure-sensitive particles in the transparent adhesive layer, whereby a resistance value between the upper transparent electrode and the lower transparent electrode changes, and the Z-direction detecting unit detects the change in a magnitude of the force.

According to a third aspect of the present invention, there is provided the touch panel according to one of first and second aspects, wherein at a frame portion that is outside peripheries of the upper transparent electrode and the lower transparent electrode where their respective wirings are disposed, a resist layer is disposed on each of the upper transparent electrode base member and the lower transparent electrode base member, and the transparent adhesive layer is disposed also between the resist layer on the upper transparent electrode base member side and the resist layer on the lower transparent electrode base member side.

According to a fourth aspect of the present invention, there is provided the touch panel according to one of the first to third aspects, further comprising:

a transparent liquid-state intermediate layer disposed between the upper transparent electrode and the insulating transparent adhesive layer.

According to a fifth aspect of the present invention, there is provided the touch panel according to the fourth aspect, wherein the intermediate layer is a silicone-base or fluorine-base inert liquid.

According to a sixth aspect of the present invention, there is provided a portable device comprises:

the touch panel according to any one of the first to fifth aspects;

a casing that supports the touch panel; and a display device that is disposed on an inner side of the touch panel inside the casing.

In the following, with reference to the drawings, embodiments of the present invention will be described in detail.

(First Embodiment)

As shown in FIG. 1, a touch panel 15 according to a first embodiment of the present invention is structured to chiefly include: an upper transparent electrode base member 1; a lower transparent electrode base member 2; a transparent adhesive layer 3; and a transparent substrate 9. As one example, a description will be given of the touch panel 15 of a quadrilateral shape.

The upper transparent electrode base member 1 is structured with a quadrilateral film having an upper transparent electrode 5 at a prescribed position inside a transparent window portion 12 on one surface (e.g., a lower surface of the upper transparent electrode base member 1 in FIG. 1). The upper transparent electrode base member 1 is just required to: be transparent; support the upper transparent electrode 5; have the electrical characteristic (such as linearity) which is equivalent to that of the transparent electrode base member of a normal touch panel; and possess the function of transferring the force acting on the other surface of the upper transparent electrode base member 1 (e.g., the upper surface of the upper transparent electrode base member 1 shown in FIG. 1) to the transparent adhesive layer 3 positioned below. Accordingly, flexibility is not necessarily a requirement for the upper transparent electrode base member 1. It is to be noted that, with the conventional touch panel, the electrode base member (film) is required to possess strength of a certain degree, so as not be collapsed by the air layer. However, in the first embodiment, since the air layer is buried by the transparent adhesive layer 3, a thinner film than a conventional one can be employed. For example, as the upper transparent electrode base member 1, engineering plastic of polycarbonate-base, polyamide-base, polyether ketone-base, or the like; or a resin film of acrylic, polyethylene terephthalate-base, polybutylene terephthalate-base, or the like can be used. Further, at a quadrilateral frame-like frame portion 11 disposed at the periphery of the upper transparent electrode base member 1 and surrounding the transparent window portion 12, and that is the one surface that surrounds the upper transparent electrode 5 (e.g., the lower surface of the upper transparent electrode base member 1 shown in FIG. 1), a upper routing electrode 5a formed by silver or the like through printing or the like and is connected to the upper transparent electrode 5 is disposed. Inside the frame portion 11, the transparent window portion 12 being an input portion of the touch panel 15 is structured. The upper routing electrode 5a including the surfaces other than the bottom surface fixed to the upper transparent electrode base member 1 is covered by an insulating resist layer 8 except for the connection terminal portion, thereby realizing insulation such that the upper routing electrode 5a and the pressure-sensitive particles 7 inside the transparent adhesive layer 3 are not brought into conduction at the frame portion 11. This is to prevent conduction from being established at the frame portion 11 when the user intends to input at the transparent window portion 12 and accidentally pushes the frame portion 11 against the user's intention.

The lower transparent electrode base member 2 is structured with a quadrilateral film having a lower transparent electrode 6 on the surface facing the surface where the upper transparent electrode 5 is disposed at a prescribed position inside the transparent window portion (e.g., the upper surface of the lower transparent electrode base member 2 shown in FIG. 1). The lower transparent electrode base member 2 is transparent, and supports the lower transparent electrode 6. The lower transparent electrode base member 2 has the electrical characteristic (such as linearity) which is equivalent to that of the transparent electrode base member of a normal touch panel. At the quadrilateral frame-like frame portion 11 disposed at the periphery of the lower transparent electrode base member 2 and surrounding the lower transparent electrode 6, and that is the surface facing the surface on which the upper transparent electrode 6 is disposed (e.g., the upper surface of the lower transparent electrode base member 2 shown in FIG. 1), a lower routing electrode Ga formed by silver or the like through printing or the like and is connected to the lower transparent electrode 6 is disposed. The lower routing electrode 6a including the surfaces other than the lower surface fixed to the lower transparent electrode base member 2 is covered by the insulating resist layer 8 except for the connection terminal portion, thereby realizing insulation such that the lower routing electrode 6a and the pressure-sensitive particles 7 inside the transparent adhesive layer 3 are not brought into conduction at the frame portion 11. This is to prevent conduction from being established at the frame portion 11 when the user intends to input at the transparent window portion 12 and accidentally pushes the frame portion 11 against the user's intention. For example, as the lower transparent electrode base member 2, engineering plastic of polycarbonate-base, polyamide-base, polyether ketone-base, or the like; or a resin film of acrylic, polyethylene terephthalate-base, polybutylene terephthalate-base, or the like can be used.

It is to be noted that, as the material of the upper transparent electrode 5 and the lower transparent electrode 6, a thin film of metal oxide such as tin oxide, indium oxide, antimony oxide, zinc oxide, cadmium oxide, ITO, or the like; metal such as gold, silver, copper, tin, nickel, aluminum, palladium, or the like; or conductive polymer can be used, for example.

On the lower surface of the lower transparent electrode base member 2, the transparent substrate 9 that supports the upper transparent electrode base member 1, the lower transparent electrode base member 2, and the like is disposed. The transparent substrate 9 has the function which is equivalent to that of the transparent substrate of a normal touch panel (such as the flexural rigidity and the optical characteristic). The transparent substrate 9 may be structured with glass, polycarbonate, or acryl, for example. The thickness thereof may be about 0.55 to 1.1 mm, for example.

The transparent adhesive layer 3 is disposed entirely at a uniform thickness at least at the transparent window portion 12 being the input portion of the touch panel 15. As one example, as shown in FIG. 1, the transparent adhesive layer 3 is disposed so as to bury the entire gap between the upper transparent electrode base member 1 and the lower transparent electrode base member 2, while bonding the upper transparent electrode base member 1 and the lower transparent electrode base member 2 to be integrated therewith.

The transparent adhesive layer 3 contains a multitude of electroconductive pressure-sensitive particles 7 dispersed in the insulating base substrate portion 3a. The material of the base substrate portion 3a of the transparent adhesive layer 3 is a solid which is colorless and transparent, being insulating, and exhibiting excellent adhesiveness to the upper transparent electrode 5 and the lower transparent electrode 6. Further, the solid does not erode the upper transparent electrode 5 and the lower transparent electrode 6. Still further, the solid exhibits the bonding characteristic before and when thermally fixed under pressure, exhibiting no bonding characteristic at the ambient temperature after thermally fixed under pressure. Still further, the solid is very little required to have elasticity. Further, the transparent adhesive layer 3 is not limited to be thermosetting, and as will be described later, a non-thermosetting, such as ultraviolet curable, paste material can also be used.

For example, the thickness of the base substrate portion 3a of the transparent adhesive layer 3 is thick enough for allowing the tunneling current to flow among the pressure-sensitive particles 7, measuring several tens µm (e.g., 40 µm to 80 µm). The base substrate portion 3a is preferably formed by screen printing, for example. The thickness of the transparent adhesive layer 3 is 40 µm or more from the viewpoint of manufacturability, and preferably up to 80 µm from the viewpoint of securing the effective flow of the tunneling current. Here, what is referred to by the tunneling current is an electric current flow formed by exuded electrons caused by the existence probability density of the electrons among the conductive particles being not zero, in a case where the conductive particles are not directly in contact with each other but are very close to each other on the order of nanometers. This is the phenomenon explained as the tunnel effect in quantum mechanics. When the pressure-sensitive particles 7 are transparent, visibility is not affected. However, when the pressure-sensitive particles 7 are opaque, the particles must be fine enough such that visibility is not affected, and be dispersed in the base substrate portion 3a. An example of the specific material of the base substrate portion 3a of the transparent adhesive layer 3 is a colorless and transparent paste (adhesive agent) with which the material of the transparent adhesive layer 3 is not repelled by the transparent electrode surface (i.e., with which a failure in applying the material of the transparent adhesive layer 3 on the transparent electrode surface due to poor wettability does not occur when the transparent adhesive layer 3 is disposed on the transparent electrode surface), and that does not erode the transparent electrodes 5 and 6. That is, an example of the specific material of the base substrate portion 3a of the transparent adhesive layer 3 is a solvent-base paste material. Examples are a heat-seal use paste that can be fixed under pressure when heated, a thermosetting or ultraviolet curable frame-use bonding paste, and the like, which do not leak out or protrude outside from the edge of the touch panel 15. That is, a bonding layer whose stickiness of the paste at the end portion is small (i.e., having no tackiness) is preferable. Specifically, as such a paste material, a solvent-base paste material commercially available from companies such as VIGteQnos Co., Ltd., Diabond Industry Co., Ltd. or the like can be employed.

The pressure-sensitive particles 7 may be particles that themselves do not deform, that are conductive to be capable of establishing electrical conduction, and that can be expected to exhibit the quantum tunnel effect whose description will follow. The particle size thereof may be the particle size suitable for printing. As one example, the pressure-sensitive particles may have the particle size that allows the particles to pass through the mesh without any resistance, when the screen printing is employed. An example of the specific material of the pressure-sensitive particles 7 may be QTC whose description will follow. The pressure-sensitive particles 7 are dispersed in the base substrate portion 3a in a range within which the visibility is not affected and electric conduction can be established.

As one example, in the transparent adhesive layer 3, a tunneling current flows through a plurality of pressure-sensitive particles 7 being close to one another out of a multitude of pressure-sensitive particles 7 being conductive particles contained in the transparent adhesive layer 3, in accordance with application of pressure irrespective of occurrence of direct contact. This causes the transparent adhesive layer 3 to enter a conductive state from an insulating state. One example of a composite structuring such a transparent adhesive layer 3 is Quantum Tunneling Composite (Quantum Tunneling Composite) available under the trade name "QTC" from Peratech Limited (PERATECH LTD), Darlington (Darlington), UK.

That is, when a force from a finger, a pen, or the like acts upon the other surface of the upper transparent electrode base member 1 (e.g., the upper surface of the upper transparent electrode base member 1 shown in FIG. 1), the acting force penetrates through the upper transparent electrode base member 1 in the thickness direction, and is transferred to the transparent adhesive layer 3. Thus, the tunnel effect occurs among the plurality of pressure-sensitive particles 7 in the transparent adhesive layer 3, and a tunneling current flows among a plurality of pressure-sensitive particles 7 to establish electrical conduction between the upper transparent electrode 5 and the lower transparent electrode 6. Thus, a change in the pressing force acting in the thickness direction (Z direction) of the touch panel 15 can be detected by a XY-directional coordinates detecting unit 20 (i.e., by converting the change into the voltage) as a change in the resistance value, and the positional coordinates (XY coordinates) where the force acted upon the upper surface of the upper transparent electrode base member 1 can be detected.

When a force acts upon the upper surface of the upper transparent electrode base member 1, the acting force causes a current to flow among the pressure-sensitive particles 7 in the transparent adhesive, layer 3, whereby electrical conduction is established between the upper transparent electrode 5 and the lower transparent electrode 6, and whereby the XY-directional coordinates detecting unit 20 can detect the positional coordinates (XY positional coordinates) upon which the force acted upon, which exist along the upper surface of the upper transparent electrode base member 1. Specifically, the XY-directional coordinates detecting unit 20 is connected to each of the upper transparent electrode 5 and the lower transparent electrode 6, and in a state where voltage is applied from the power supply across the terminals of the upper transparent electrode 5, the XY-directional coordinates detecting unit 20 detects a change in the voltage between one terminal of the upper transparent electrode 5 and one terminal of the lower transparent electrode 6, to thereby detect a X-directional positional coordinate. Next, in a state where application of the voltage across the terminals of the upper transparent electrode 5 is stopped and thereafter the voltage from the power supply is switched to be applied across the lower transparent electrode 6, the XY-directional coordinates detecting unit 20 can detect a change in the voltage between the one terminal of the lower transparent electrode 6 and the one terminal of the upper transparent electrode 5, to thereby detect a Y-directional positional coordinate.

Further, though it has been described that, after the X-directional positional coordinate is detected in a state where the voltage is applied to the upper transparent electrode 5, the Y-directional positional coordinate is detected in a state where the voltage is applied to the lower transparent electrode 6, the present invention is not limited thereto. Alternatively, after the Y-directional positional coordinate is detected in a state where the voltage is applied to the upper transparent electrode 5, and the X-directional positional coordinate may be detected in a state where the voltage is applied to the lower transparent electrode 6.

On the other hand, Z-directional position detection is carried out by a Z-directional coordinate detecting unit 21. That is, when a force acts upon the upper surface of the upper transparent electrode base member 1, by the acting force, a current flows among the pressure-sensitive particles 7 in the transparent adhesive layer 3, whereby the resistance value between the upper transparent electrode 5 and the lower transparent electrode 6 changes, and the Z-directional coordinate detecting unit 21 can detect a change in the magnitude of the force.

More specifically, the Z-directional coordinate detecting unit 21 can detect a change in the magnitude of the force in the following manner (see "Reducing Analog Input Noise in Touch Screen Systems", on the website of Texas Instruments Incorporated).

Figure 2A:
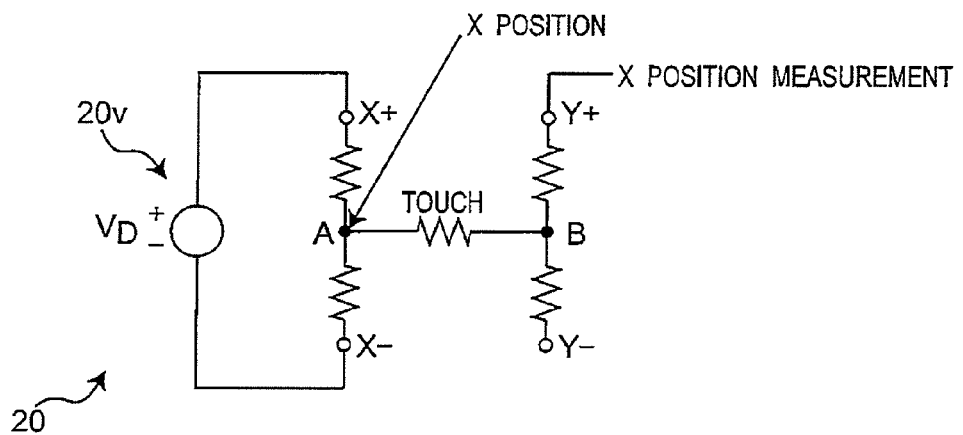
FIG. 2A is a view showing XY coordinates measurement in the plane of a resistive film type touch panel, which describes that a panel drive voltage is supplied from a power supply to an $X_+$ terminal and an $X_-$ terminal, whereby the coordinate position of X can be read from a $Y_+$ terminal.

That is, when the touch panel 15 is a resistive film type touch panel, in general, the pressure thereof is inversely proportional to a resistance value $R_Z$ between points A and B shown in FIG. 2A. The resistance value $R_Z$ is obtained from formula (1):

$$R_Z = (VB - VA)/I_{TOUCH} \tag{1}$$

where, $$VA = V_D \times Z_1 / Q$$

$$VB = V_D \times Z_2 / Q$$

Figure 2B:
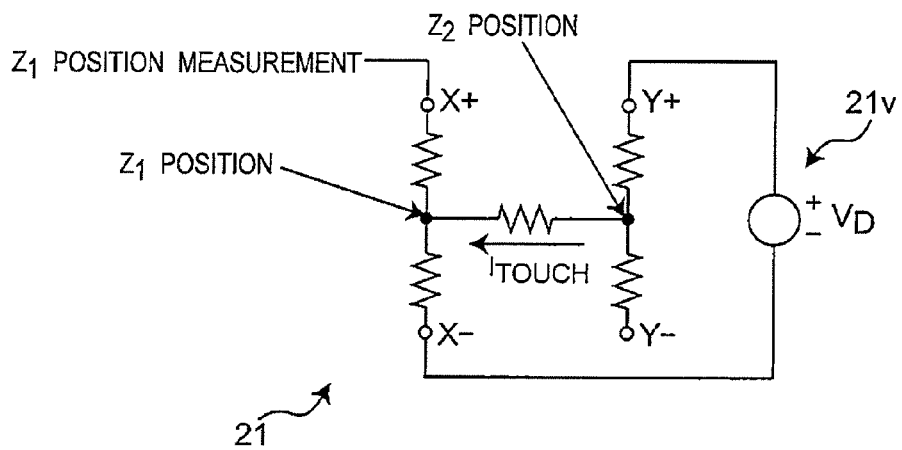
FIG. 2B is a view showing pressure measurement of the resistive film type touch panel, which describes that a panel drive voltage is supplied from the power supply to the $Y_+$ terminal and the $X_-$ terminal, whereby a $Z_1$ position can be read from the $X_+$ terminal and a $Z_2$ position can be read from a $Y_-$ terminal.

$Z_1$ and $Z_2$ are measured $Z_1$ position and $Z_2$ position, respectively, and Q is a resolving power of a coordinate detection control circuit (an A/D converter that is structured with a circuit that subjects a detected voltage value to A(analog)/D (digital) conversion to obtain digital coordinates). For example, when the resolving power is 12 bits, the resolution is 4096 (Q=4095 is obtained because 0 also is counted), and the range of the X coordinate (X=$Z_1$) and the range of the Y coordinate (Y=$Z_2$) are 0 to 4095 (since some amount of voltage is consumed by the routing circuit and the control-related circuit of the touch panel, the actual range is narrower than the foregoing). For example, Q=256 when the resolving power of the coordinate detection control circuit is 8 bits; Q=1024 when 10 bits; and Q=4096 when 12 bits. As shown in FIG. 2B, in a case where the drive voltage of a prescribed voltage is applied from the coordinate detection control circuit or the power supply ($V_{DD}$) 21v across the $Y_+$ terminal and the $X_-$ terminal, when the resistance value between the $X_+$ terminal and the $X_-$ terminal is $R_X$, based on that the resistance value between the point A and $X_-$ is $R_{XA} = R_X \times X/Q$, the following is derived:

$$I_{TOUCH} = V_A / R_{XA} = (V_D \times Z_1 / Q) / R_{XA}$$

Here, FIG. 2A is a view showing XY coordinates measurement of a resistive film type touch panel, and FIG. 2B is a view showing pressing force measurement of the resistive film type touch panel. With reference to FIG. 2A, the panel drive voltage is applied from the power supply 20v to the $X_+$ terminal and the $X_-$ terminal, and the X coordinate position can be read from the $Y_+$ terminal. With reference to FIG. 2B, the panel drive voltage is applied from the power supply 21v to the $Y_+$ terminal and the $X_-$ terminal, and the $Z_1$ position can be read from the $X_+$ terminal, and the $Z_2$ position can be read from the $Y_-$ terminal.

As shown in FIG. 2A, X is a measurement value of X position in a case where the coordinate detection control circuit attempts to detect the coordinate position of X. Accordingly, substituting the formula of $I_{TOUCH}$ into formula (1), formula (2) is obtained. It is to be noted that, $I_{TOUCH}$ is a value of current that flows when an input is received at the panel when connection is established as shown in FIG. 2B, and since the current is always constant in a serial path, it can be obtained from the calculation formula stated above.

$$R_Z = \{[V_D \times (Z_2 - Z_1)/Q]/[V_D \times Z_1/Q]\} \times R_{XA} = R_X \times X/Q$$
$$[(Z_2/Z_1) - 1] \quad (2)$$

In a case where the touch panel is not touched by a finger or a pen, the resistance value $R_Z$ in the Z direction (thickness direction) of the touch panel approximates infinity. When a force from a finger, a pen, or the like acts upon the touch panel, a current flows and the resistance value assumes a value of several hundreds to 1 kΩ, as being inversely proportional to the pressure (P) applied to the touch panel. That is, the pressure P on the touch panel can be expressed as the function of $R_Z$, and is calculated by the following formula (3):

$$P = \alpha - \beta \times R_Z \quad (3)$$

Where α and β are positive real values obtained from experiments.

In the calculation method described above, from the $Z_1$ position and the $Z_2$ position (XY coordinates) and the $R_X$ being the resistance value between the $X_+$ terminal and the $X_-$ terminal, the resistance value at the touch portion between the upper and lower electrodes is calculated. Since the resistance value at the touch portion between the upper and lower electrodes changes when the pressing pressure and the pressed area change, a relative change in the pressing pressure (and the pressed area) can be detected.

Next, a description will be given of mobile phones 18 and 18A each of which are one example of a portable device having installed therein the touch panel 15.

Figure 3:
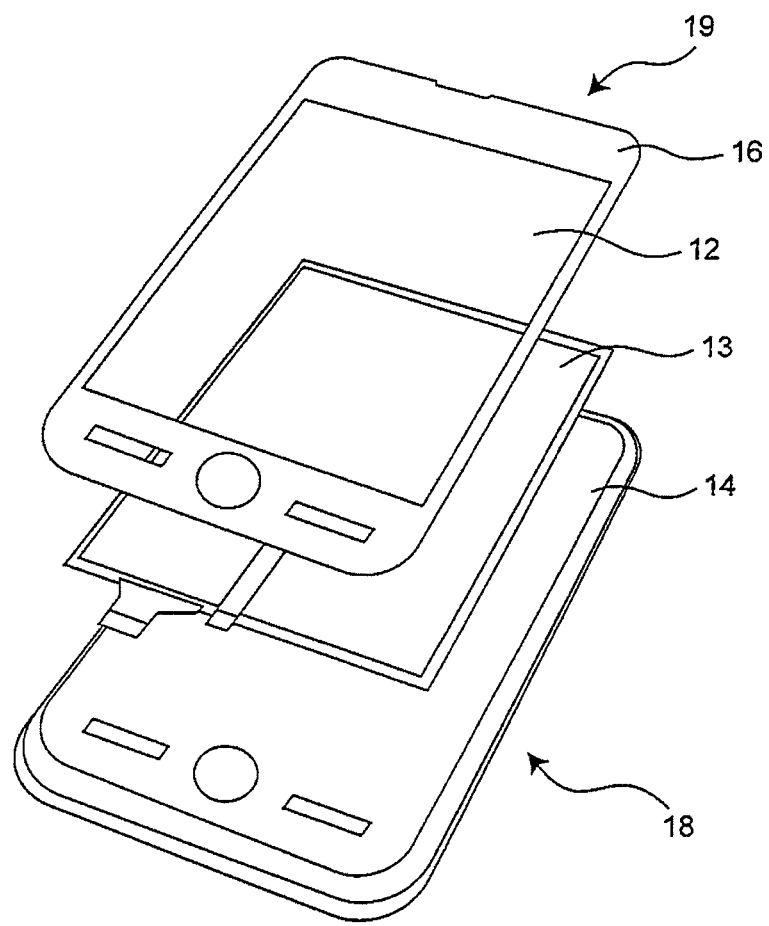
FIG. 3 is a partial exploded view of a touch-window type mobile phone in which a resistive film type touch panel according to the first embodiment is installed.
Figure 4:
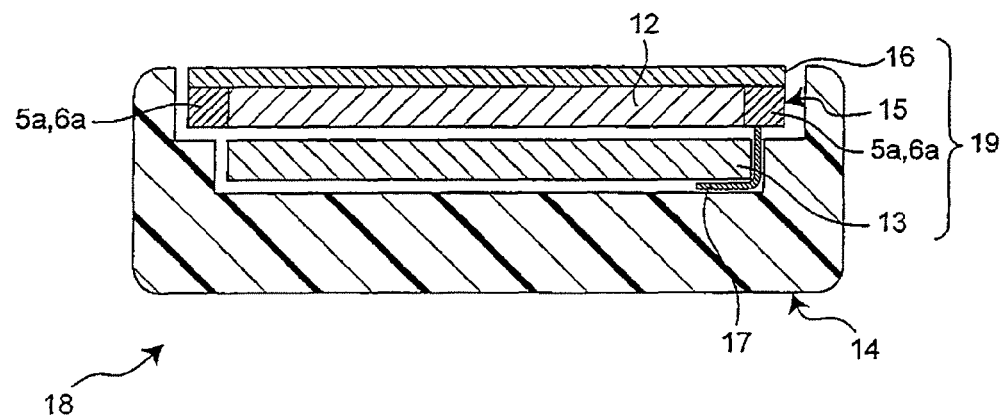
FIG. 4 is a cross-sectional view of the touch-window type mobile phone in which the resistive film type touch panel according to the first embodiment is installed.

FIGS. 3 and 4 each show a touch window 19, in which the surface layer of the resistive film type touch panel 15 is provided with decoration (a decorative layer 16) by printing. The touch panel 15 is fitted into a first concave portion 14a of a casing 14, and disposed such that the outer circumferential surface of the first concave portion 14a of the casing 14 and the outer surface of the touch panel 15 are flush with each other. To a second concave portion 14b formed at the bottom surface of the first concave portion 14a, a display 13 of liquid crystal, organic EL or the like is fixed. The indication of the display 13 can be seen through the transparent window portion 12 of the touch panel 15. Reference numeral 17 is a wiring from the routing electrodes 5a and 6a.

With such a structure, since the circuit portion is hidden by the decorative layer 16, the touch window 19 provided with the decoration (decorative layer 16) by printing can be implemented on the surface. Thus, a thin and stylish design can be realized with no step between the touch panel 15 and the casing 14. The design is unrestricted from the bezel structure, and a reduction in thickness which cannot be realized with the normal touch panel is achieved.

Figure 5:
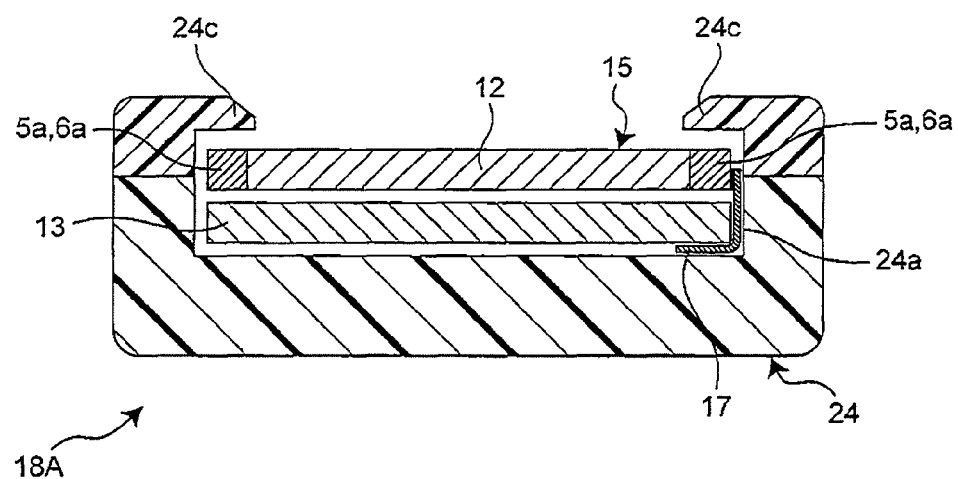
FIG. 5 is a cross-sectional view of a bezel structure type mobile phone in which the resistive film type touch panel according to the first embodiment is installed.

With another structure shown in FIG. 5, a bezel 24c of the casing 4 covers the circuit portion such as the routing electrodes 5a and 6a, such that the circuit portion cannot be seen. The casing 24 is provided with one large concave portion 24a. Into the concave portion 24a, the display 13 of liquid crystal, organic EL or the like and the touch panel 15 are fitted. The circuit portion such as the routing electrodes 5a and 6a of the touch panel 15 are covered by the bezel 24c of the casing 4.

According to the first embodiment described above, the following effect can be achieved.

Figure 6:
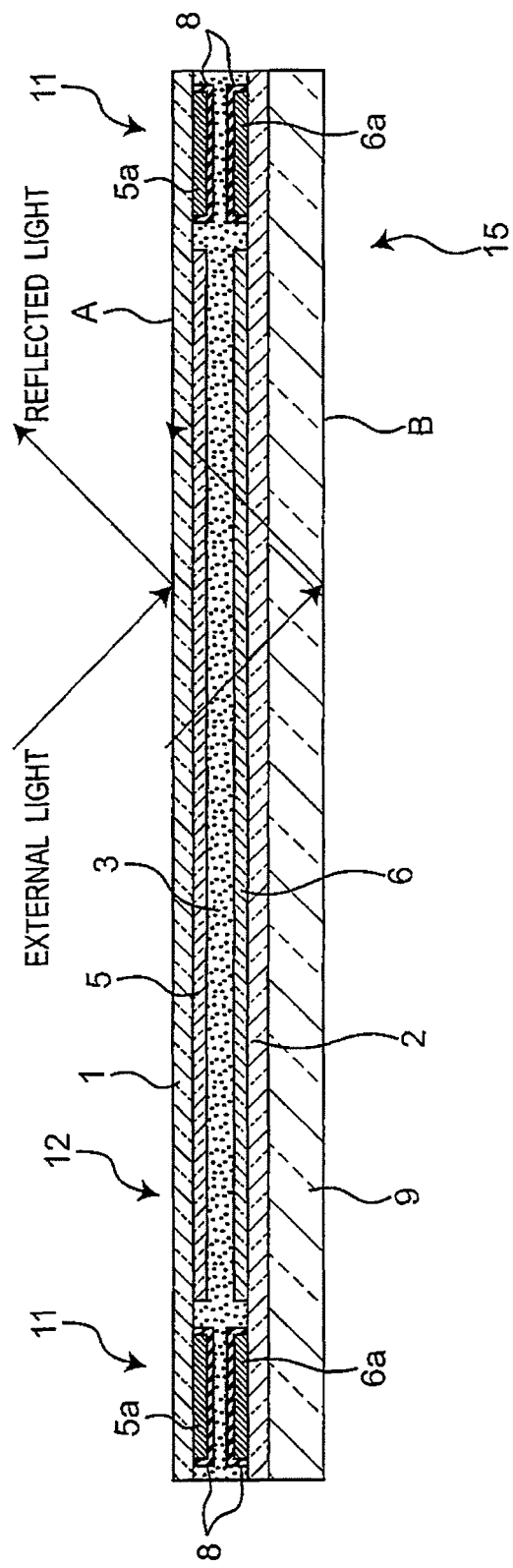
FIG. 6 is a cross-sectional view for describing reflection occurring at interfaces of the touch panel according to the first embodiment.
Figure 11:
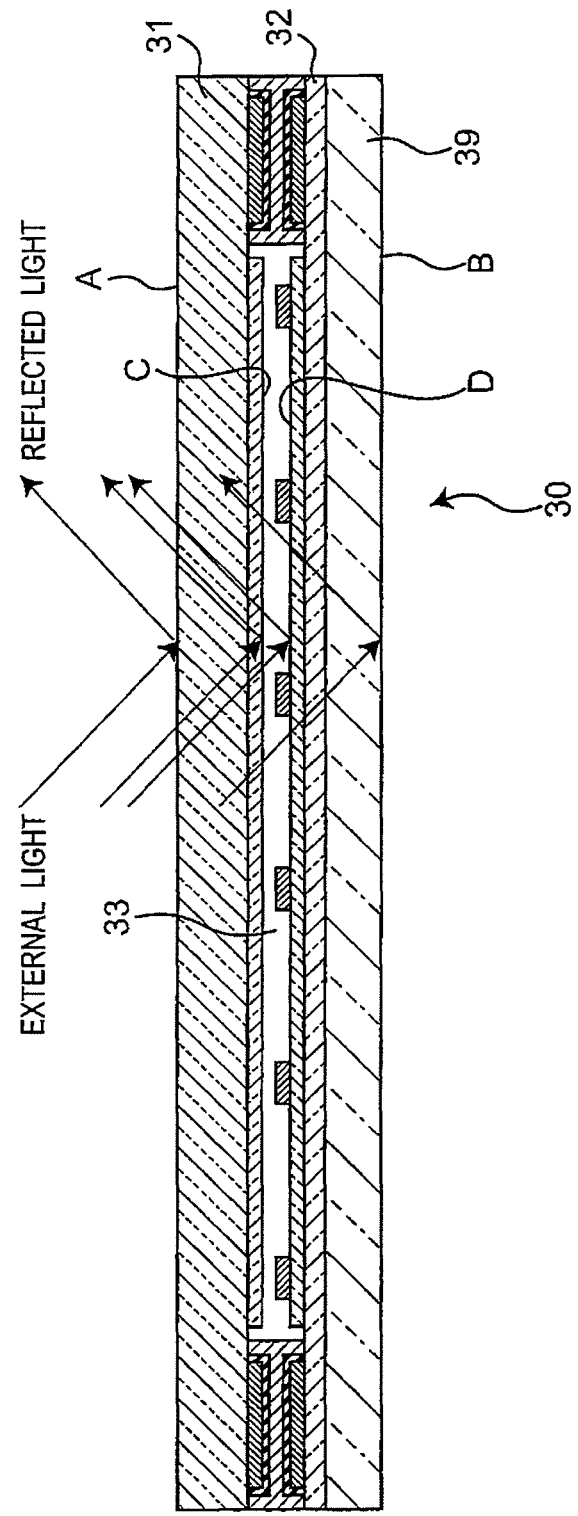
FIG. 11 is a cross-sectional view for describing reflection occurring at interfaces of a conventional touch panel.

The gap between the upper transparent electrode base member 1 and the lower transparent electrode base member 2 is filled with the transparent adhesive layer 3 as a pressure-sensitive adhesive layer without any air layer. Therefore, the reflection of light occurring at the interfaces (i.e., two interfaces, namely, the interface between the upper transparent electrode base member 1 and the air layer, and the interface between the air layer and the lower transparent electrode base member 2) can be suppressed, and occurrence of Newton's rings can be prevented, whereby visibility can be improved. Specifically, as shown in FIG. 6, in general, light is greatly reflected off the interface with the air. On the other hand, there are only two layers, namely an interface A between the upper surface of the upper transparent electrode base member 1 and the air layer outside the touch panel 15, and an interface B between the substrate 9 and the air layer outside the touch panel 15; while two layers, namely an interface C between the lower surface of the upper transparent electrode base member 1 and the air layer of the gap, and an interface D between the upper surface of the lower transparent electrode base member 2 and the air layer of the gap are eliminated. Thus, the reflectivity is reduced by about 15 to 20%, for example. In contrast, with a conventional touch panel 30, as shown in FIG. 11, reflection occurs at four layers, namely an interface A between the upper surface of a upper transparent electrode base member 31 and the air layer outside the touch panel 30, an interface C between the lower surface of the upper transparent electrode base member 31 and the air layer of a gap 33, an interface D between the upper surface of a lower transparent electrode base member 32 and the air layer of the gap 33, and an interface B between a substrate 39 and the air layer outside the touch panel 30. Further, when the gap amount of the air layer between the upper transparent electrode and the lower transparent electrode becomes extremely small, Newton's rings occur. These are the cause of a reduction in visibility.

Further, the gap between the upper transparent electrode base member 1 and the lower transparent electrode base member 2 is filled with the transparent adhesive layer 3 as a pressure-sensitive adhesive layer, whereby the strength of the touch panel itself improves. Thus, it becomes possible to structure the upper transparent electrode base member 1 thinner than a conventional one, and the thickness of the entire touch panel can be reduced. For example, in contrast to the conventional manner in which the upper transparent electrode base member 1 is structured to be thicker than the lower transparent electrode base member 2 such that the upper transparent electrode base member 1 possesses rigidity, the upper transparent electrode base member 1 can be structured to have the same thickness as that of the lower transparent electrode base member 2. In other words, conventionally, the upper transparent electrode base member 1 and the lower transparent electrode base member 2 are held by only a frame-purpose bonding layer surrounding them, to maintain a space between the upper transparent electrode base member 1 and the lower transparent electrode base member 2 to secure insulation. To this end, the upper transparent electrode base member 1 is required to have rigidity, and consequently, the upper transparent electrode base member 1 must be thicker than the lower transparent electrode base member 2. However, in the first embodiment, such a space can be eliminated by the transparent adhesive layer 3, whereby it becomes unnecessary for the upper transparent electrode base member 1 to have rigidity. Thus, the thickness of the upper transparent electrode base member 1 can be reduced, e.g., to the thickness of the lower transparent electrode base member 2 (alternatively, depending on the material, the upper transparent electrode base member 1 can be made thinner than the lower transparent electrode base member 2). It is to be noted that, since the insulation between the upper transparent electrode 5 and the lower transparent electrode 6 can be secured by the insulating transparent adhesive layer 3, no problem occurs.

Further, the transparent adhesive layer 3 as a pressure-sensitive adhesive layer is interposed between the upper transparent electrode base member 1 and the lower transparent electrode base member 2 without any gap. Therefore, the conventional grid-shaped frame-purpose bonding layer can be dispensed with. Accordingly, steps of aligning and bonding can be dispensed with.

Still further, the gap between the upper transparent electrode base member 1 and the lower transparent electrode base member 2 is filled with the transparent adhesive layer 3 as a pressure-sensitive adhesive layer without any gap and whereby the strength of the touch panel itself improves. Therefore, the formation width of the resist layer of the frame portion 11 can be made smaller by about 0.3 mm than in the conventional manner. Thus, with the same size, the visual recognition region, that is, the transparent window portion 12 can more be enlarged. That is, conventionally, the formation width of the bonding layer to some extent must be secured in order to prevent the upper and lower electrode films from peeling off and to prevent water intrusion, and the formation width of the resist layer must be designed taking into consideration of the tolerance, such that the paste material is not brought into contact with the exposed portion of the transparent electrodes of ITO.

Still further, the gap between the upper transparent electrode base member 1 and the lower transparent electrode base member 2 is filled with the transparent adhesive layer 3 as a pressure-sensitive adhesive layer. Therefore, even when the touch panel 15 is used in a high temperature and high humidity state, troubles such as dew condensation or fogging will not occur between the upper transparent electrode base member 1 and the lower transparent electrode base member 2, because there is no air layer.

Still further, the gap between the upper transparent electrode base member 1 and the lower transparent electrode base member 2 is filled with the transparent adhesive layer 3 as a pressure-sensitive adhesive layer, and it is not necessary for the upper transparent electrode base member 1 to bend. It is not intended that the upper transparent electrode base member 1 deforms to bring the electrodes into contact with each other to be conductive. Therefore, a local stress associated with an input will not occur at the upper transparent electrode layer, and the upper transparent electrode base member 1 and the upper transparent electrode 5 formed at the upper transparent electrode base member 1 possessing excellent durability can be provided.

Figure 12:
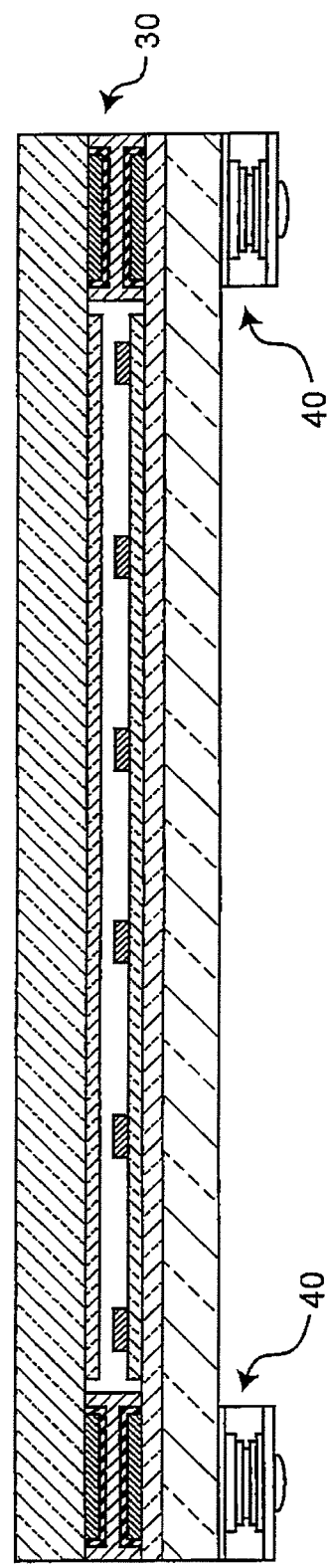
FIG. 12 is a cross-sectional view showing an example of a structure in a case where a pressure sensitive sensor is disposed in the conventional touch panel.

Still further, it is not necessary to newly provide a pressure sensitive sensor to the outside, e.g., to the lower side, of the touch panel 15 to detect the acting force. Accordingly, it becomes possible to reduce the thickness of the touch panel 15 to be compact. In contrast, in a conventional manner where a pressure sensitive sensor is disposed on the inner side of the touch panel, as shown in FIG. 12, a pressure sensitive sensor 40 is bonded on the inner side of the touch panel 30. Therefore, in addition to the thickness of the touch panel 30, the thickness of the pressure sensitive sensor 40 is added, which inevitably increases the thickness of the touch panel as a whole. On the other hand, in the first embodiment, the pressure sensitive sensor can be disposed inside the structure of the touch panel itself. Thus, a reduction in the number of components makes it possible to reduce the costs. While it appears to be structured similarly to a normal touch panel, not only the XY coordinate detection, but also the pressure sensing function can be provided. Thus, a very compact and high-performance touch panel can be provided.

Still further, the transparent adhesive layer 3 is interposed between the upper transparent electrode base member 1 and the lower transparent electrode base member 2, and therefore, spacers which are conventionally used can be dispensed with. Thus, a step of forming such spacers becomes unnecessary, and a reduction in costs can be achieved.

(Second Embodiment)

Figure 7:
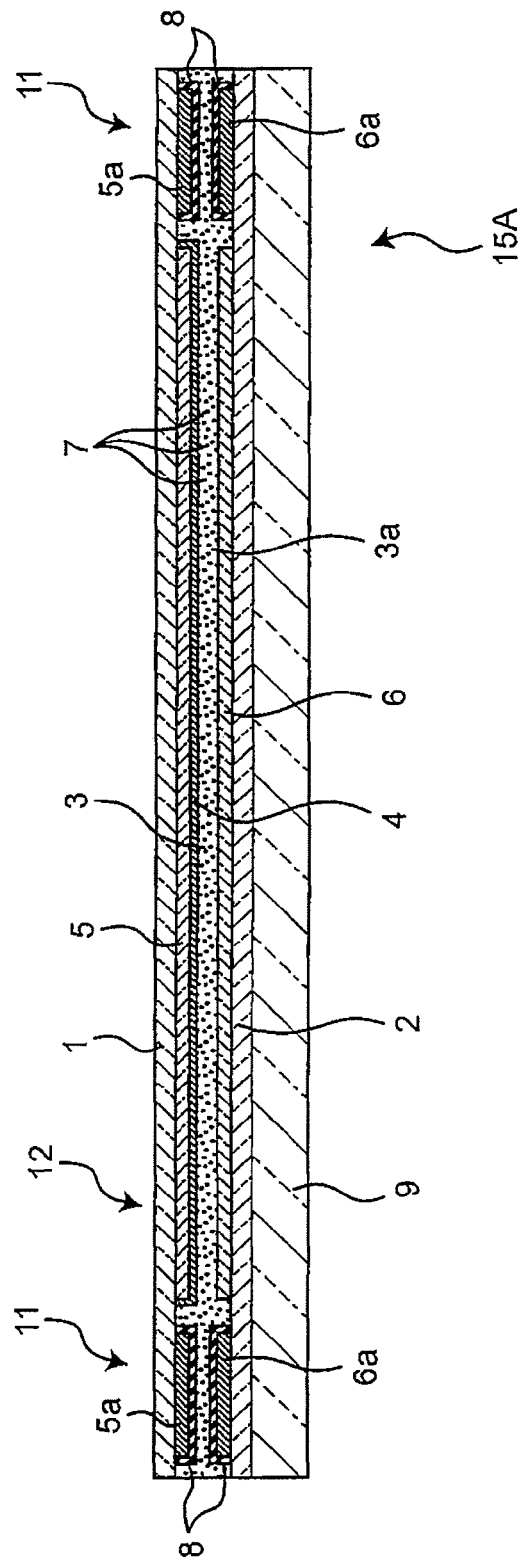
FIG. 7 is a cross-sectional view of a touch panel according to a second embodiment of the present invention.
Figure 8:
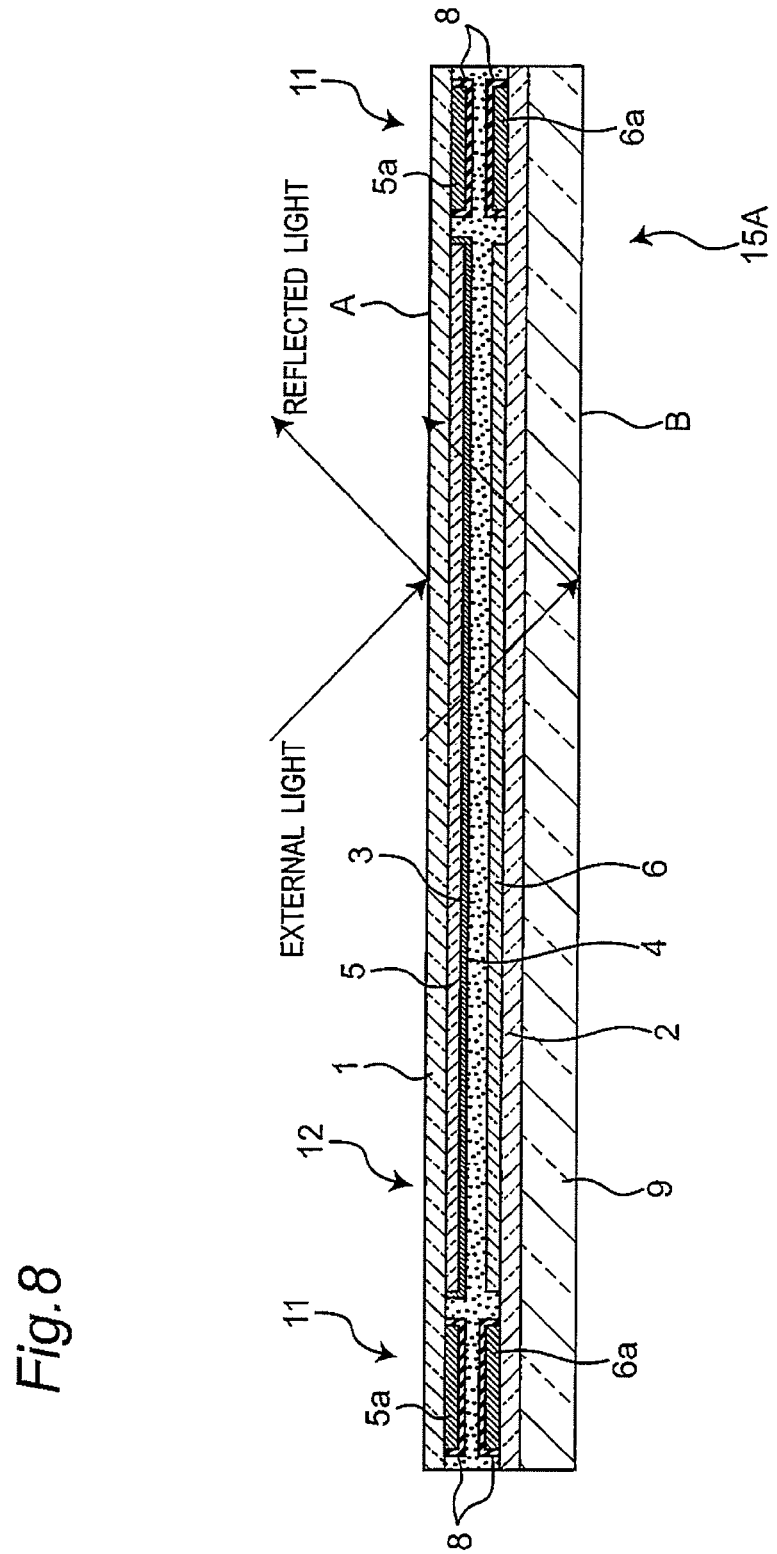
FIG. 8 is a cross-sectional view for describing reflection occurring at interfaces of the touch panel according to the second embodiment.

As shown in FIG. 7, a touch panel 15A according to a second embodiment of the present invention is different from the first embodiment in that in addition to the touch panel 15 according to the first embodiment, there is further provided a transparent liquid-state intermediate layer 4 disposed between the upper transparent electrode 5 and the insulating transparent adhesive layer 3. The rest of the structure of the second embodiment is identical to that of the first embodiment and, therefore, a description thereof will not be repeated. In the following, a description will be given of the second embodiment focusing on the difference from the first embodiment.

The intermediate layer 4 is disposed with a substantially uniform thickness, at least at the transparent window portion 12 being an input portion of the touch panel 15A. As shown in FIG. 7 as one example, the intermediate layer 4 is disposed on the entire surfaces between the upper transparent electrode 5 and the transparent adhesive layer 3 so as to entirely bury the gap between the upper transparent electrode 5 and the transparent adhesive layer 3, serving to prevent few bubbles (bubble inclusion) 22 from being produced when the upper transparent electrode base member 1 is stacked on the transparent adhesive layer 3. In FIG. 7, the intermediate layer 4 is disposed so as to cover the lower surface facing the transparent adhesive layer 3 and all the side surfaces of the upper transparent electrode 5. It is to be noted that, for bonding to the upper transparent electrode base member 1 and to the lower transparent electrode base member 2, it is necessary to provide a grid-shaped region to the frame portion 11 surrounding the transparent window portion 12, in which frame-shaped region the intermediate layer 4 is not formed.

The intermediate layer 4 may be conductive or non-conductive, but the intermediate layer 4 must be in a liquid state. Despite the intermediate layer 4 being in a liquid state, the intermediate layer 4 will not flow out, because the intermediate layer 4 is bonded to the upper and lower members by the transparent adhesive layer 3. Further, when an input is received, though only the pressed portion of the intermediate layer 4 flows, it results in a temporary increase in thickness of just the portion surrounding the pressed portion. When the pressing is released, the flow again occurs and the thickness of the portion having been pressed recovers the original thickness. Thus, when the intermediate layer 4 is in a liquid state, the flexibility of its shape is high. Therefore, when the upper transparent electrode base member 1 is stacked (see FIG. 9), bubbles (bubble inclusion) 22 are not likely to be produced between the transparent adhesive layer 3 and the upper transparent electrode base member 1. Even when they are produced, by slidably pressing the bubbles (bubble inclusion) 22 over the upper transparent electrode base member 1 with a finger or the like, the bubbles (bubble inclusion) 22 can easily be shifted to be removed from the inside of the transparent window portion 12 (see FIG. 10). In more detail, the bubbles (bubble inclusion) 22 are produced when the upper transparent electrode base member 1 is stacked because of the shape of the transparent adhesive layer 3 being low in flexibility. That is, as described in the foregoing, since the transparent adhesive layer 3 is of a nature not leaking out or protruding out from the edge of the touch panel 15A, the shape of the transparent adhesive layer 3 is low in flexibility, and when it is entirely formed on the lower transparent electrode base member 2, an adequate smoothness will not be obtained on the upper surface of the transparent adhesive layer 3. As a result, when there is no intermediate layer 4, bubbles (bubble inclusion) 22 are produced when the upper transparent electrode base member 1 is stacked. Furthermore, since the shape of the transparent adhesive layer 3 is low in flexibility, and the transparent adhesive layer 3 bonds to the upper transparent electrode base member 1 with its entire surface, it is difficult to shift the produced bubbles (bubble inclusion) 22 to be removed from the inside of the transparent window portion 12. It is to be noted that, in the description and in the claims, the liquid state also includes a gel state.

On the other hand, as in the second embodiment, when the liquid-state intermediate layer 4 is disposed between the transparent adhesive layer 3 and the upper transparent electrode base member 1, since the intermediate layer 4 is in a liquid state, the flexibility of the shape of the intermediate layer 4 disposed between the transparent adhesive layer 3 and the upper transparent electrode base member 1 becomes high. Accordingly, when the upper transparent electrode base member 1 is stacked (see FIG. 9), bubbles (bubble inclusion) 22 are unlikely to be produced between the transparent adhesive layer 3 and the upper transparent electrode base member 1. Further, provided that bubbles 22 are produced, by slidably pressing the bubbles 22 over the upper transparent electrode base member 1 with a finger or the like, the bubbles (bubble inclusion) 22 formed in the liquid-state intermediate layer 4 can easily be shifted in the liquid-state intermediate layer 4, so as to be removed from the inside of the transparent window portion 12 to the outside (see FIG. 10).

Further, as in the second embodiment, when the intermediate layer 4 disposed between the transparent adhesive layer 3 and the upper transparent electrode base member 1 is in a liquid state, even a slight pressing force causes the intermediate layer 4 to shift. Therefore, when a force acts upon the other surface of the upper transparent electrode base member 1 (e.g., the upper surface of the upper transparent electrode base member 1 shown in FIG. 7) with a finger, a pen, or the like, the acted force can be transferred to the transparent adhesive layer 3 substantially as it is. That is, when a force acts upon the other surface of the upper transparent electrode base member 1 (e.g., the upper surface of the upper transparent electrode base member 1 shown in FIG. 7) with a finger, a pen, or the like, the acted force penetrates the upper transparent electrode base member 1 and the intermediate layer 4 in the thickness direction, and is transferred to the transparent adhesive layer 3, whereby the tunnel effect occurs among a plurality of pressure-sensitive particles 7 in the transparent adhesive layer 3. Then, among a plurality of pressure-sensitive particles 7 the tunneling current flows, establishing electrical conduction between the upper transparent electrode 5 and the lower transparent electrode 6. A change in the pressing force acting in the thickness direction (Z direction) of the touch panel 15A can be detected (by converting into a change in the voltage) as a change in the resistance value by the XY-directional coordinates detecting unit 20. Thus, on the upper surface of the upper transparent electrode base member 1, the positional coordinates (XY coordinates) upon which the force acted can be detected. It is to be noted that, as described above, the intermediate layer 4 shifts even with the slight pressing force, whereby the intermediate layer 4 does not exist or becomes thinner immediately below the pressing point. Therefore, even when the intermediate layer 4 is non-conductive, a change in the resistance value can be detected.

Figure 9:
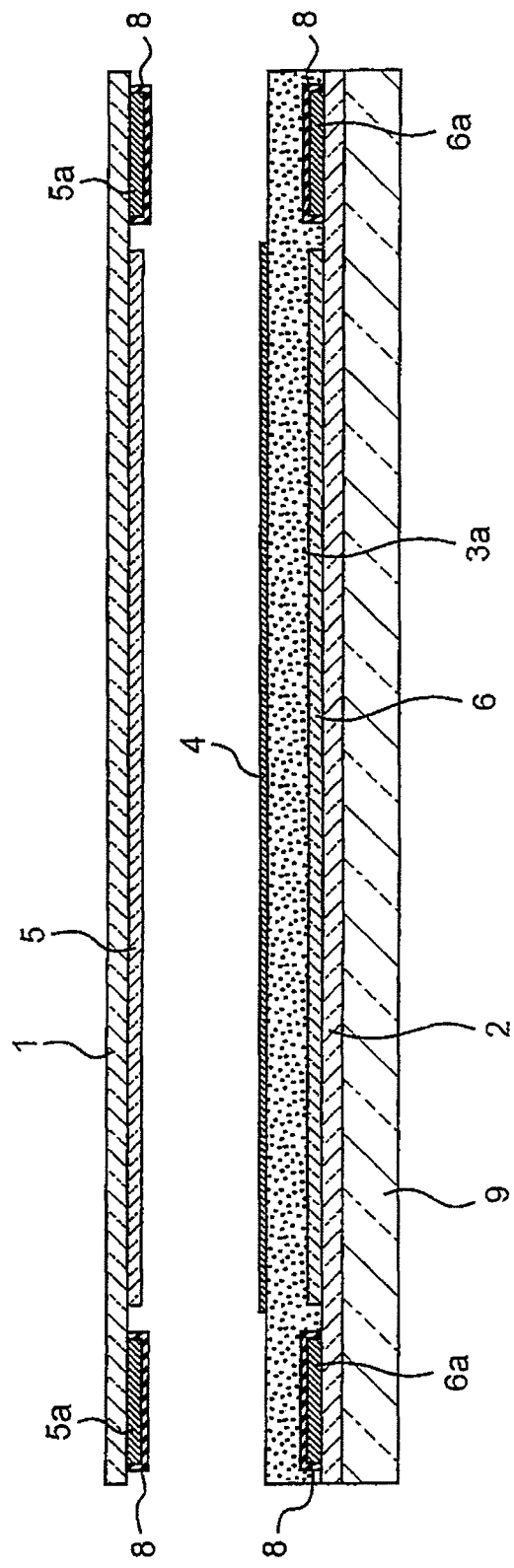
FIG. 9 is a cross-sectional view for describing a stacked state of the touch panel according to the second embodiment.
Figure 10:
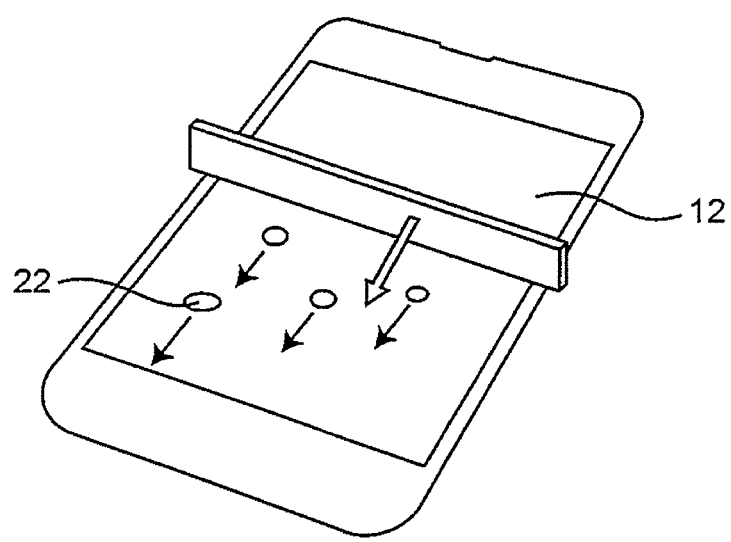
FIG. 10 is a perspective view showing example of a step of removing bubbles in manufacturing the touch panel according to the second embodiment.

The thickness of the intermediate layer 4 is about 0.1 µm to 1000 µm, and the intermediate layer 4 may be formed on the transparent adhesive layer 3 by coating application or ink-jet technology (see FIG. 9). The thickness of the intermediate layer 4 is 0.1 µm or more from the viewpoint of manufacturability. It is preferable that bubbles (bubble inclusion) 22 shift by the intermediate layer 4 and can be removed to the outside. Additionally, from the viewpoint of the capability of slight pressing force shifting the intermediate layer 4 and transferring the acted force to the transparent adhesive layer 3 substantially as it is, it is preferable that the thickness of the intermediate layer 4 is 1000 µm at the maximum. By stacking the upper transparent electrode 5 of the upper transparent electrode base member 1 on the intermediate layer 4 formed on the transparent adhesive layer 3 by coating application, ink-jet technology, or the like, the intermediate layer 4 is disposed so as to cover the lower surface and all the side surfaces of the upper transparent electrode 5. Further, in a case where the touch panel is used so that the normal to the input surface of the touch panel is tilted relative to the vertical line, that is, in a case where the touch panel is used as being stood, a deviation will occur in the thickness by its own weight when the thickness of the intermediate layer 4 is great. Therefore, it is preferable that the maximum thickness is 10 µm or less.

Specific example of the intermediate layer 4 may be silicone-base or fluorine-base inert liquid. For example, fluorine-base inert liquid available from 3M Company (trade name "Fluorinert" or "Novec"), silicone oil (trade name "KF" or "HIVAC") available from Shin-Etsu Chemical Co., Ltd. are the commercially available materials.

As described above, according to the second embodiment, in the structure filled with the transparent adhesive layer 3, since the transparent liquid-state intermediate layer 4 is formed and disposed between the upper transparent electrode 5 and the transparent adhesive layer 3, few bubbles (bubble inclusion) 22 that are produced when the upper transparent electrode base member 1 is stacked on the transparent adhesive layer 3 can be expelled substantially completely.

Further, as to the upper transparent electrode base member 1, in a conventional touch panel, the electrode base member (film) is required to have certain strength so as not to be collapsed by the air layer. In the second embodiment, the air layer is buried by the transparent adhesive layer 3, and few bubbles (bubble inclusion) 22 that still remain can be expelled by the intermediate layer 4. Therefore, it becomes possible to employ the film that is thinner than conventional ones.

Since the gap between the upper transparent electrode base member 1 and the lower transparent electrode base member 2 is filled with the transparent adhesive layer 3 as a pressure-sensitive adhesive layer, and the intermediate layer 4 is formed between the upper transparent electrode 5 at the lower surface of the upper transparent electrode base member 1 and the transparent adhesive layer 3, there is no air layer between the upper transparent electrode base member 1 and the upper transparent electrode 5 and the transparent adhesive layer 3. Therefore, the reflection of light occurring at the interfaces (i.e., two interfaces, namely, the interface between the upper transparent electrode base member 1 and the air layer, and the interface between the air layer and the lower transparent electrode base member 2) can be suppressed, and occurrence of the Newton's rings can be prevented, whereby visibility can be improved.

Further, the gap between the upper transparent electrode base member 1 and the lower transparent electrode base member 2 is filled with the transparent adhesive layer as a pressure-sensitive adhesive layer, and the intermediate layer 4 is formed between the upper transparent electrode 5 and the transparent adhesive layer 3. Therefore, the strength of the touch panel itself can be improved; the upper transparent electrode base member 1 can be structured thinner than the conventional ones; and the thickness of the entire touch panel can be reduced.

Still further, the transparent adhesive layer 3 as a pressure-sensitive adhesive layer is interposed between the upper transparent electrode base member 1 and the lower transparent electrode base member 2 without any gap, and the frame portion 11 surrounding the transparent window portion 12 has the frame-shaped region where the intermediate layer 4 is not formed. Therefore, the conventional frame-shaped frame-purpose bonding layer becomes unnecessary, and steps of aligning and bonding such a bonding layer can be dispensed with.

Still further, the gap between the upper transparent electrode base member 1 and the lower transparent electrode base member 2 is filled with the transparent adhesive layer 3 as a pressure-sensitive adhesive layer, and further the intermediate layer 4 is disposed between the upper transparent electrode 5 and the transparent adhesive layer 3. Therefore, even when the touch panel 15A is used in a high temperature and high humidity state, troubles such as dew condensation or fogging will not occur between the upper transparent electrode base member 1 and the lower transparent electrode base member 2, because there is no air layer.

Still further, the gap between the upper transparent electrode base member 1 and the lower transparent electrode base member 2 is filled with the transparent adhesive layer 3 as a pressure-sensitive adhesive layer, and the intermediate layer 4 is interposed between the upper transparent electrode 5 and the transparent adhesive layer 3. Therefore, it is not necessary for the upper transparent electrode base member 1 to bend, and it is not intended that the upper transparent electrode base member 1 deforms to bring the electrodes into contact with each other to be conductive. Therefore, a local stress associated with an input will not occur at the upper transparent electrode layer, and the upper transparent electrode base member 1 and the upper transparent electrode 5 formed at the upper transparent electrode base member 1 possessing excellent durability can be provided.

It is to be noted that the present invention is not limited to the foregoing embodiments, and can be realized in various modes.

For example, as necessary, in order to further improve adhesiveness, a transparent and conductive primer layer can be interposed between the transparent adhesive layer 3 and the other layer.

The transparent adhesive layer 3 is not limited to a single layer, and can be structured with a plurality of layers.

Though the description has been given in the first and second embodiments of the resistive film type in connection with the touch panels 15 and 15A, the present invention is not limited thereto. It goes without saying that the present invention can also be applied to a capacitive type touch panel.

It is to be noted that, any appropriate combinations of foregoing various embodiments can achieve their respective effects.

Industrial Applicability

In the touch panel of the present invention and the portable device using the touch panel, the gap between the upper transparent electrode base member and the lower transparent electrode base member is filled with the transparent adhesive layer as a pressure-sensitive adhesive layer without any air layer. Therefore, occurrence of Newton's rings can be prevented, and visibility can be improved. Thus, the present invention is useful for a mobile phone, a portable game device, an electronic dictionary, a car navigation system, a personal computer, a digital camera, a video camera, a portable MD (PMD), or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A touch panel, comprising:
   an upper transparent electrode base member that has an upper transparent electrode disposed on one surface of the upper transparent electrode base member;
   a lower transparent electrode base member that has a lower transparent electrode disposed on a surface of the lower transparent electrode base member facing the surface of the upper transparent electrode base member on which the upper transparent electrode is disposed; and
   an insulating transparent adhesive layer that is disposed between the upper transparent electrode and the lower transparent electrode, the insulating transparent adhesive layer including a plurality of pressure-sensitive particles dispersed therein,
   wherein when a force acts upon another surface of the upper transparent electrode base member, the acting force causes a current to flow among the pressure-sensitive particles in the insulating transparent adhesive layer, whereby an electrical conduction is established between the upper transparent electrode and the lower transparent electrode, and positional coordinates where the force acted upon along the other surface of the upper transparent electrode base member are detected,
   wherein the touch panel further comprises, at a frame portion that is outside peripheries of the upper transparent electrode and the lower transparent electrode where respective wirings of the upper transparent electrode and the lower transparent electrode are disposed, a first resist layer disposed on the upper transparent electrode base member and a second resist layer disposed on the lower transparent electrode base member, and
   wherein the insulating transparent adhesive layer is disposed between the first resist layer on the upper transparent electrode base member side and the second resist layer on the lower transparent electrode base member side.

2. The touch panel according to claim 1, further comprising:
   a Z-direction detecting unit, wherein when the force acts upon the other surface of the upper transparent electrode base member, the acting force causes the current to flow among the pressure-sensitive particles in the transparent adhesive layer, whereby a resistance value between the upper transparent electrode and the lower transparent electrode changes, and the Z-direction detecting unit detects change in a magnitude of the force.

3. A portable device, comprising:

the touch panel according to claim 1;

a casing that supports the touch panel; and a display device that is disposed on an inner side of the touch panel inside the casing.

4. A portable device, comprising:

the touch panel according to claim 2;

a casing that supports the touch panel; and a display device that is disposed on an inner side of the touch panel inside the casing.

* * * * *